United States Patent [19]

Bekele et al.

[11] Patent Number: 4,592,861
[45] Date of Patent: Jun. 3, 1986

[54] ANTISTATIC THERMOPLASTIC COMPOSITION COMPRISING A GRAFT POLYMER, HALOGENATED THERMOPLASTIC POLYMER AND CONDUCTIVE CARBON BLACK

[75] Inventors: Solomon Bekele, South Bend, Ind.; Victor W. Lee, Deerfield, Ill.

[73] Assignee: Uniroyal Chemical Company, Inc., Middlebury, Conn.

[21] Appl. No.: 618,631

[22] Filed: Jun. 8, 1984

[51] Int. Cl.$^4$ .............................................. C08K 3/04
[52] U.S. Cl. .................................. 252/511; 523/174; 524/495; 524/496; 524/504
[58] Field of Search .................... 252/511; 523/174; 524/504, 496, 495

[56] References Cited

U.S. PATENT DOCUMENTS

| 3,053,800 | 9/1962 | Grabowski et al. | 526/229 |
| 3,877,605 | 4/1975 | Fourier | 525/121 |
| 4,128,539 | 12/1978 | Onizawa et al. | 525/382 |
| 4,129,608 | 12/1978 | Murayama et al. | 525/309 |
| 4,228,050 | 10/1980 | Martin et al. | 523/174 |
| 4,280,941 | 7/1981 | Datta et al. | 523/174 |
| 4,299,736 | 11/1981 | Datta | 252/511 |
| 4,329,276 | 5/1982 | Reardon | 524/524 |
| 4,329,278 | 5/1982 | Reardon | 524/523 |
| 4,351,747 | 9/1982 | Miyamoto et al. | 252/511 |
| 4,378,310 | 3/1983 | Datta et al. | 252/511 |
| 4,386,175 | 5/1983 | Kuramochi et al. | 524/525 |
| 4,396,660 | 8/1983 | Hata et al. | 523/174 |
| 4,412,941 | 11/1983 | Probst et al. | 523/174 |
| 4,465,615 | 8/1984 | Hata et al. | 252/511 |

FOREIGN PATENT DOCUMENTS 200435 12/1982 Japan .

OTHER PUBLICATIONS

C.A. 98-199235 (1983) Dec. 8, 1982, JP 57,202,435, Nippon Zeon Co.
Derwent Abst. 00477B/01 (Jan. 1979) GB2000158, Sumitomo.
Derwent Abst. 37274D/21 (Apr. 1981) J56035306, Dainichi.
Derwent Abst. 85340Y/48 (Oct. 1977) J52124038, Kokokugum.
Derwent Abst. 30654B/16 (Mar. 1979) J54032578, Sumitomo.

Primary Examiner—Herbert J. Lilling
Attorney, Agent, or Firm—William E. Dickheiser

[57] ABSTRACT

An antistatic thermoplastic composition comprising a blend of a thermoplastic graft polymer; a thermoplastic halogenated polymer; and an amount of conductive carbon black effective to cause the composition to have a surface resistivity of $10^2$–$10^{12}$ ohm/square, wherein the ratio of (a)/(b) is from 9:1–1:9, by weight and the weight percentage of (c) is from 2–10%.

7 Claims, No Drawings

ANTISTATIC THERMOPLASTIC COMPOSITION COMPRISING A GRAFT POLYMER, HALOGENATED THERMOPLASTIC POLYMER AND CONDUCTIVE CARBON BLACK

This invention relates to an electrically conductive thermoplastic composition useful for wire and cable jacketing and other areas where it is desired to prevent static electricity build up.

The invention provides an antistatic composition based on a blend of at least two thermoplastic polymers with conductive carbon black.

Highly electrically conductive carbon black has been disclosed as useful for compounding plastics, elastomers and coatings in applications where electrical conductivity is required. Thus, in Product Data Bulletin No. 75-9 published by Armak Company on Ketjenblack (trademark) EC highly conductive carbon black, it is disclosed that this high surface area carbon black has certain advantages over other commercially available ECF, SCF and acetylene type blacks, in compounding electrically conductive compositions. Applications mentioned include high voltage wire and cable compounds. Polymers mentioned include polyethylene, thermoplastic elastomers and ethylene-propylene rubber.

Use of conductive polymer in ignition leads and coaxial cable has been disclosed (Norman, "Conductive Rubbers and Plastics", Applied Science Publishers, Ltd., P. 253).

The present invention is directed to a thermoplastic blend comprising a thermoplastic graft polymer, a thermoplastic halogenated polymer, and an amount of conductive carbon black effective to cause the composition to have a surface resistivity of $10^2$–$10^{12}$ ohm/square. Said blend is characterized by exceptionally good antistatic properties in comparison to their homopolymer counterparts at the same carbon black concentration.

Suitable graft polymers for use in the invention are well known and are produced by grafting certain resin forming monomers onto elastomeric spine polymers. The elastomeric spine polymers may be diene rubbers such as polybutadiene, poly(butadiene-styrene), butadiene-styrene block copolymers, polyisoprene, natural rubber, poly(butadiene-acrylonitrile), poly(butadiene-isobutylene) or the like, or ethylene-alpha-olefin-non-conjugated diene terpolymers such as ethylene-propylene-dicyclopentadiene, ethylene-propylene-5-ethylidene-2-norbornene or ethylene-propylene-1,4-hexadiene terpolymers, all known as EPDM.

Resin forming monomers for making the graft polymers of the invention include styrene, alpha-methylstyrene, acrylonitrile, methacrylonitrile, ethacrylonitrile, acrylic acid, methacrylic acid or their methyl, ethyl, propyl or butyl esters; also vinyl ethers or vinyl esters such as methyl vinyl ether, butyl vinyl ether, vinyl acetate, vinyl propionate and the like.

Preferred graft polymers are those based on polybutadiene, butadiene-styrene copolymer or EPDM spines grafted with styrene, acrylonitrile, methyl acrylate or mixtures thereof.

The halogenated polymers of the invention may be poly(vinylidene chloride), poly(vinyl chloride), chlorinated poly(vinyl chloride), poly(vinyl bromide), poly(methylchloro-acrylate), poly(chlorostyrenes) or the like; poly(vinyl chloride) being preferred.

Conductive carbon blacks considered useful for this invention are those having a surface area of at least 500 $m^2/g$, preferably at least 800 $m^2/g$, most preferably at least 900 $M^2/g$ (BET: $N_2$ absorption). Such carbon blacks may further be characterized by their dibutyl phthalate absorption (320–360 ml/100 g), iodine number (900–1000 mg/g) and pH (ca. 9.5), but it is believed that the surface area is the most critical property regarding conductivity.

The following Table A illustrates the parameters of the essential ingredients of the blend of the instant invention:

TABLE A

| Parameters | Broad | Preferred | Most Preferred |
|---|---|---|---|
| (a)/(b) (weight) | 9/1–1/9 | 4/1–1.2/1 | 1.5/1–2.3/1 |
| (c), % (weight) | 2–10 | 3–8 | 5–7.5 |
| SR[1], ohm/square | $10^2$–$10^{12}$ | $10^3$–$10^{10}$ | $10^5$–$10^8$ |

Remarks:
[1]Surface resistivity
(a) thermoplastic graft polymer
(b) thermoplastic halogenated polymer
(c) carbon black Most desirably, component (a) is ABS (acrylonitrile-butadiene-styrene graft polymer), and the halogenated polymer is poly(vinyl chloride) (PVC). The following Table B illustrates the ranges of torque for ABS and inherent viscosity.

TABLE B

| Parameters | Broad | Preferred | Most Preferred |
|---|---|---|---|
| ABS: Torque[1], m.g. | 500–2500 | 750–2000 | 100–1750 |
| PVC: I.V.[2] | 1.5–0.5 | 1.1–0.75 | 1.1–0.8 |

Remarks:
[1]Measured in Brabender [trademark] plastometer at 204° C., 63 RPM.
[2]Inherent viscosity according to ASTM 1243 A.

The preparation of the compositions follows essentially procedures customary in the art, i.e., in a Banbury [trademark] type internal mixer, an open mill, a transfer mix or other suitable mixing means, the polymers may be premixed above their melting or softening temperatures and carbon black, etc. may then be added, or all ingredients may be charged at once and mixing carried out until an essentially homogeneous blend is achieved.

It should be understood that the compositions of this invention may also contain processing aids such as extender oils or plasticizers, antioxidants, u.v. stabilizers, fire retardants, smoke depressants, curatives, if necessary, and the like.

The following examples illustrate the invention without necessarily limiting its scope.

EXAMPLE 1

Antistatic compositions were prepared by mixing in a one-shot fashion the ingredients listed below in a Banbury mixer at 350° F. (177° C.) (all by parts by weight):

| Run No. | 1 | 2 | 3 |
|---|---|---|---|
| ABS-1[1] | 60 | — | 28 |
| ABS-2[2] | 30 | — | 14 |
| PVC[3] | — | 77.5 | 29.7 |
| CCB[4] | 6.4 | 6.4 | 6.4 |
| CPE[5] | — | 11.3 | 10.6 |
| $Sb_2O_3$ | — | — | 6.1 |
| Stabilizer[6] | — | 1.9 | 1.9 |
| Antioxidant[7] | 2.1 | — | 1.0 |
| Lubricant | 1.5 | 1.3 | 2.3 |
| Processing aid[8] | — | 1.6 | — |

| Run No. | 1 | 2 | 3 |
|---|---|---|---|
| Total | 100 | 100 | 100 |

Remarks:
[1]ABS-1: Melt Flow Index (MFI) = 1.6 (ASTM D 1238 G).
[2]ABS-2: MFI = 0 (as above)
[3]PVC: Inherent viscosity about 0.95 (ASTM D 1243A).
[4]Conductive Carbon Black, Surface area = 1000 m$^2$/g.
[5]CPE: Chlorinated polyethylene, 36% Cl (by weight)
[6]Dibutyltinbis (isooctylthioglycolate).
[7]Trialkyl phosphite.
[8]Polyacrylate powder.

After mixing, each run was divided into three separate portions, and for each run, one portion was milled at 300° F. (149° C.) for 2 minutes, another for 15 minutes and the last portion for 30 minutes. Subsequently, each milled portion was calendered to a thickness of 0.065 in. (ca. 1.7 mm) for measurement. The surface resistivity (S.R.) on each portion was determined; the results are summarized below.

| Run No. | 1 | 2 | 3 |
|---|---|---|---|
| S.R. milled 2 min, ohm/square | $2.1 \times 10^5$ | $8.7 \times 10^{12}$ | $5.6 \times 10^3$ |
| S.R. milled 15 min, ohm/square | $8.0 \times 10^5$ | $1.9 \times 10^{13}$ | $1.0 \times 10^4$ |
| S.R. milled 30 min, ohm/square | $1.9 \times 10^{13}$ | $3.5 \times 10^{13}$ | $6 \times 10^4$ |

The above data indicate that at the same concentration of conductive carbon black, the ABS/PVC blend exhibits a surface resistivity far below that of either ABS or PVC alone.

EXAMPLE 2

Following essentially the procedure and ingredients outlined in Example 1 another antistatic composition was prepared using the recipe below.

| Ingredients | Parts |
|---|---|
| ABS-1 | 31.3 |
| ABS-2 | 14.7 |
| PVC | 29.4 |
| CCB | 5.9 |
| Stabilizer | 0.9 |
| Antioxidant | 1.8 |
| CPE | 7.1 |
| Sb$_2$O$_3$ | 6.5 |
| Lubricant | 2.4 |
| Total | 100 |

The physical and electrical properties were determined with these results:

| Tensile strength, psi | 5000 |
|---|---|
| MPa | 34.5 |
| Hardness, Rockwell R | 1.02 |
| Flexural Modulus, psi | $2.1 \times 10^5$ |
| MPa | $14.5 \times 10^2$ |
| S.R., ohms/square | $1 \times 10^5$ (ASTM D257) |
| Fire Ratings: | |
| U.L. 94 V-O and 1 | pass |
| USFAR 25-853 B | pass |

EXAMPLE 3

Using essentially the recipe of Example 2 and method of Example 1, the effect of conductive carbon black levels on surface resistivity was investigated. These results were obtained:

| Run No. | 4 | 5 | 6 | 7 |
|---|---|---|---|---|
| CCB, % weight | 4 | 6 | 8 | 10 |
| S.R., ohms/square | $3.5 \times 10^{12}$ | $3.6 \times 10^5$ | $3.8 \times 10^3$ | $8.6 \times 10^2$ |

The above experiments were repeated, however, the ABS/PVC weight ratio was changed from 2.1 to 0.47 with these results:

| Run No. | 8 | 9 | 10 | 11 |
|---|---|---|---|---|
| CCB, % weight | 4 | 6 | 8 | 10 |
| S.R., ohms/square | $2 \times 10^{12}$ | $2.3 \times 10^{11}$ | $4.6 \times 10^5$ | $2.3 \times 10^3$ |

The above results demonstrate the excellent surface resistivity reduction achieved at relatively low levels of conductive carbon black.

We claim:

1. An antistatic thermoplastic composition comprising a blend of
   (a) a thermoplastic graft polymer;
   (b) a thermoplastic halogenated polymer; and
   (c) an amount of conductive carbon black effective to cause the composition to have a surface resistivity of $10^2$–$10^{12}$ ohm/square,
   wherein the ratio of (a)/(b) is from 9:1–1:9, by weight and the weight percentage of (c) is from 2–10%.

2. The composition of claim 1 wherein said graft polymer (a) is based on a diene rubber spine or an ethylene-propylene-nonconjugated diene spine.

3. The composition of claim 1 wherein said halogenated polymer (b) is a thermoplastic containing chlorine atoms.

4. The composition of claim 2 wherein (a) is a diene rubber grafted with styrene and acrylonitrile monomer.

5. The composition of claim 3 wherein (b) is poly(vinyl chloride).

6. The composition of claim 1 wherein said conductive carbon black (c) has a BET surface area of 500–1500 m$^2$/g.

7. The composition of claim 1, wherein the ratio of (a)/(b) is from 1.5:1–2.3:1 and the percentage weight of (c) is from 5–7.5%, and the surface resistivity is from $10^5$–$10^8$.

* * * * *

UNITED STATES PATENT AND TRADEMARK OFFICE
CERTIFICATE OF CORRECTION

PATENT NO. : 4,592,861

DATED : June 3, 1986

INVENTOR(S) : Solomon Bekele et al.

It is certified that error appears in the above-identified patent and that said Letters Patent is hereby corrected as shown below:

On the cover page of the patent, at [73] Assignee:, please delete "Uniroyal Chemical Company, Inc." and substitute therefor --Uniroyal Plastics Company, Inc.--.

Signed and Sealed this

Thirteenth Day of January, 1987

*Attest:*

DONALD J. QUIGG

*Attesting Officer*  *Commissioner of Patents and Trademarks*